W. W. MARSH.
LINER FOR CENTRIFUGAL CREAM SEPARATORS.
APPLICATION FILED OCT. 28, 1907.

907,157.

Patented Dec. 22, 1908.

WITNESSES:

INVENTOR
W. W. Marsh,
BY
G. C. Kennedy,
ATTORNEY

UNITED STATES PATENT OFFICE.

WILBUR W. MARSH, OF WATERLOO, IOWA.

LINER FOR CENTRIFUGAL CREAM-SEPARATORS.

No. 907,157.	Specification of Letters Patent.	Patented Dec. 22, 1908.

Application filed October 28, 1907. Serial No. 399,459.

*To all whom it may concern:*

Be it known that I, WILBUR W. MARSH, a citizen of the United States of America, and a resident of Waterloo, Blackhawk county, Iowa, have invented certain new and useful Improvements in Liners for Centrifugal Cream-Separators, of which the following is a specification.

My invention relates to improvements in liners for centrifugal cream separators, and the object of my invention is to improve the separating capacity of that class of liners which are composed of a vertical series of superimposed frusta, by filling the unoccupied space beneath the lowermost frustum and the bowl's bottom with an auxiliary liner adapted to act on the unseparated milk at that location and thus enhance the capacity of the combined liner by increasing the baffling surfaces therein. This object I have accomplished by the means which are hereinafter described and claimed, and which are illustrated in the accompanying drawing, in which:—

Figure 1:
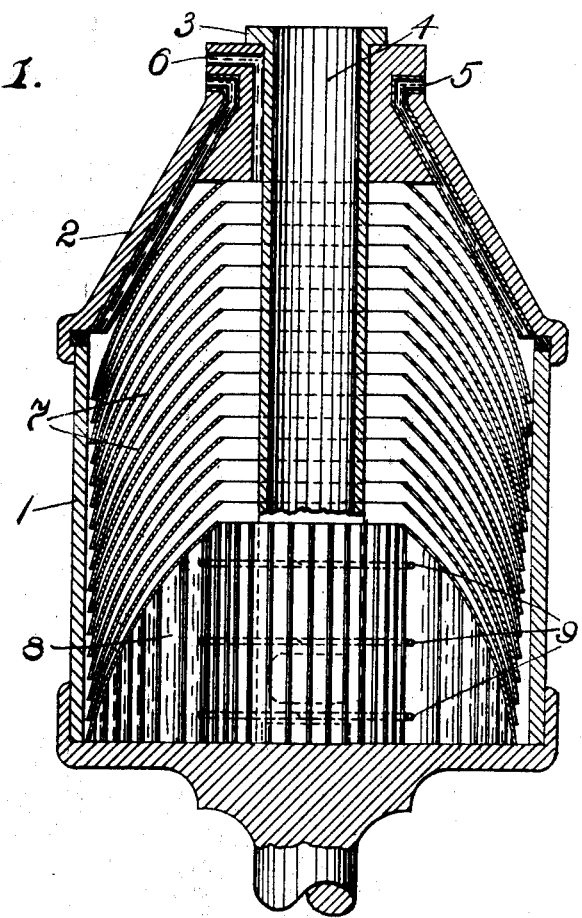
Figure 2:
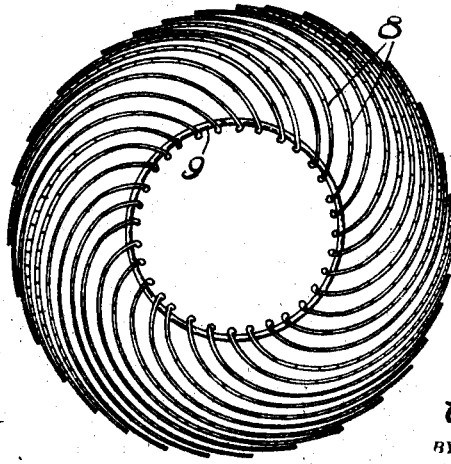

Figure 1 is a central vertical axial section of a centrifugal cream separator bowl with my improved combination liner therein, and Fig. 2 is an upper plan view of my improved auxiliary device for lining the space contained between the lowermost frustum and the bottom of the bowl.

Similar numbers refer to similar parts throughout the several views.

The numeral 1 designates a centrifugal cream separator bowl having a cover 2, the latter having a central axial opening for the reception of a hollow clamping bolt 3 whose upper end engages the top of the cover by means of a fillet, while its lower end is screwed on to a threaded boss in the center of the bottom of said bowl. The axial inlet hollow of said bolt is indicated by the numeral 4, and the lower end of the bolt has a lateral opening into the interior of the bowl, but the lower end of the bolt is shown in Fig. 1 as broken away, the continuation of same downward being indicated by dotted lines only. The use of a special form of bolt or milk inlet, however, is not claimed by me, since any other suitable type of bowl, with cover and proper means for securing it in place may be used in connection with my invention, the parts hereinbefore described being merely shown for purposes of illustration. The bowl may be provided with any suitable form or arrangement of milk-exit, such as 5, and with a cream-exit, such as 6.

I have shown in Fig. 1 a well-known type of liner, composed of the series of hollow frusta 7, arranged in vertical superimposed alinement in the bowl concentric with its axis. These frusta are spaced apart, and their inner edges are shown as spaced apart from the axial bolt 3, to provide room for the cream wall as well as a passage just outside of said cream wall for the upward flow of the separating full milk.

It will be observed that the frusta shown fill all of the space in the bowl above the lowermost of them; but that a considerable unfilled space is left below the lowermost frustum and the bottom of the bowl, which space I have filled with an auxiliary lining device so as to obtain a complete system of lining plates in every part of the hollow interior of the bowl. If this space was left unoccupied, the whole capacity of the bowl in skimming would not be in effective use, when the form of lining device shown above such space is employed. My improved auxiliary lining device is composed of a plurality of vertical plates 8, bent spirally, and having their inner edges connected to each other by any suitable means so as to play freely to and from each other when taken from the bowl for the purpose of washing them. The particular means employed and shown herein for securing the inner edges of the plates 8 together so as to slide freely toward and away from each other when removed from the bowl is more clearly depicted in Fig. 2. Two or more small orifices are made near the inner vertical edge of each plate and a split-ring 9 is inserted in each horizontal series of holes, so the plates freely slide on the rings to and from each other when the device is removed from the bowl. When thus removed the plates are easily separated for cleansing. It will be observed that the plates are each formed on a spiral curve, and this has the effect of controlling the currents of milk in that part of the bowl which has heretofore been left vacant. Another result of the peculiar curvature of the plates 8 is to cause a gradual and progressive diminishing of the interspaces between them from their inner edges outward, which not only affords a better clearance for the cream as it separates most freely near the axis of the bowl, but also draws nearer together the baffling surfaces of the plates in the outer zone of the device where the nearly skimmed milk does not need so large a clearance in order to void its remaining small percentage of cream globules.

In practice the plates 8 when in operative position in the bowl lie so close together at their outer edges that no retaining device is needed to retain them in their proper place. The milk after moving through this auxiliary device moves upward and moves between the plates 7 in the usual way, the separated cream moving inward and upward to the cream exit 6, while the skimmed milk seeks the outer zone of the bowl impelled by centrifugal force, and issues thence through the milk exits 5. The combined liner shown completely fills the cavities of the bowl, and therefore provides the maximum amount of efficiency in the separating capacity of the bowl.

Having described my invention, what I claim as new, and desire to secure by Letters Patent, is:—

1. A liner for a centrifugal cream separator, composed, in combination, of a series of superimposed hollow frusta, and a lining device adapted to fill the cavity under the lowermost frustum, such device being formed of a plurality of vertical plates.

2. A liner for a centrifugal cream separator, composed, in combination, of a series of superimposed hollow frusta, and a lining device adapted to fill the cavity under the lowermost frustum, such device being formed of a plurality of vertical plates, such plates being slidably connected to each other.

3. A liner for a centrifugal cream separator, composed, in combination, of a series of superimposed hollow frusta, and a lining device adapted to fill the cavity under the lowermost frustum, such device being formed of a plurality of curved vertical plates.

4. A liner for a centrifugal cream separator, composed, in combination, of a series of superimposed hollow frusta, and a lining device adapted to fill the cavity within the lowermost frustum, such device being formed of a plurality of curved vertical plates connected near their inner edges.

Signed at Waterloo, Iowa, this 23rd day of Oct. 1907.

WILBUR W. MARSH.

Witnesses:
G. C. KENNEDY,
O. D. YOUNG.